US012037912B2

(12) United States Patent
Lutjen et al.

(10) Patent No.: US 12,037,912 B2
(45) Date of Patent: Jul. 16, 2024

(54) ADVANCED PASSIVE CLEARANCE CONTROL (APCC) CONTROL RING PRODUCED BY FIELD ASSISTED SINTERING TECHNOLOGY (FAST)

(71) Applicant: RTX Corporation, Farmington, CT (US)

(72) Inventors: Paul M. Lutjen, Kennebunkport, ME (US); John R. Farris, Lebanon, CT (US); Matthew A. Devore, Rocky Hill, CT (US); John A. Sharon, West Hartford, CT (US); James F. Wiedenhoefer, Windsor, CT (US); Mario P. Bochiechio, Vernon, CT (US); Brian T. Hazel, Avon, CT (US)

(73) Assignee: RTX CORPORATION, Farmington, CT (US)

(*) Notice: Subject to any disclaimer, the term of this patent is extended or adjusted under 35 U.S.C. 154(b) by 27 days.

(21) Appl. No.: 17/842,932

(22) Filed: Jun. 17, 2022

(65) Prior Publication Data

US 2023/0323784 A1 Oct. 12, 2023

Related U.S. Application Data

(60) Provisional application No. 63/212,325, filed on Jun. 18, 2021, provisional application No. 63/232,967, filed on Aug. 13, 2021.

(51) Int. Cl.
*F01D 11/18* (2006.01)
*F01D 25/00* (2006.01)

(52) U.S. Cl.
CPC ............ *F01D 11/18* (2013.01); *F01D 25/005* (2013.01); *F05D 2230/22* (2013.01); *F05D 2230/90* (2013.01); *F05D 2260/30* (2013.01)

(58) Field of Classification Search
CPC ........ F01D 11/18; F01D 25/005; F01D 5/147; F01D 5/28; F01D 5/14; F05D 2230/22;
(Continued)

(56) References Cited

U.S. PATENT DOCUMENTS 3,394,918 A 7/1968 Wiseman
5,264,011 A 11/1993 Brown et al.
(Continued)

FOREIGN PATENT DOCUMENTS

DE 102014206827 A1 10/2015
EP 0309627 B1 6/1993
(Continued)

OTHER PUBLICATIONS

Lin et al. "Sintering and joining of Ni-based superalloys via FAST for turbine disc applications" Metallurgical and Materials Transactions A, vol. 51 No. 3, pp. 1353-1366 (Mar. 2020).
(Continued)

*Primary Examiner* — Courtney D Heinle
*Assistant Examiner* — Andrew Thanh Bui
(74) *Attorney, Agent, or Firm* — CANTOR COLBURN LLP

(57) ABSTRACT

An advanced passive clearance control (APCC) control ring is provided. The APCC control ring includes first and second cover sections, first and second wall sections and a control ring. At least one of the first and second cover sections is bonded to corresponding edges of the first and second wall sections by field assisted sintering technology (FAST) processing along a bond surface to form an enclosure for the control ring.

17 Claims, 3 Drawing Sheets

(58) Field of Classification Search
CPC .... F05D 2230/90; F05D 2260/30; B22F 5/04; B22F 3/105
See application file for complete search history.

(56) References Cited

U.S. PATENT DOCUMENTS

| | | | |
|---|---|---|---|
| 5,395,699 A | | 3/1995 | Ernst et al. |
| 5,636,439 A | | 6/1997 | Cunha et al. |
| 6,131,800 A | | 10/2000 | Fernihough et al. |
| 6,217,282 B1 | | 4/2001 | Stanka |
| 6,384,365 B1 | | 5/2002 | Seth et al. |
| 7,371,049 B2 | | 5/2008 | Cunha et al. |
| 7,441,331 B2 | | 10/2008 | Hudson et al. |
| 8,267,663 B2 | | 9/2012 | Larose et al. |
| 8,474,137 B2 | | 7/2013 | Richter et al. |
| 9,221,101 B2 | | 12/2015 | Hugot et al. |
| 9,656,321 B2 | | 5/2017 | Cui et al. |
| 9,687,910 B2 | | 6/2017 | Bullied et al. |
| 9,700,941 B2 | | 7/2017 | James et al. |
| 9,782,862 B2 | | 10/2017 | Kamel et al. |
| 9,802,248 B2 | | 10/2017 | Marcin, Jr. et al. |
| 9,976,435 B2 | * | 5/2018 | Borja ........................ F01D 5/02 |
| 10,005,125 B2 | | 6/2018 | Shah et al. |
| 10,035,185 B2 | | 7/2018 | Shah et al. |
| 10,065,239 B2 | | 9/2018 | Marcin, Jr. et al. |
| 10,239,142 B2 | | 3/2019 | Bareiss et al. |
| 10,247,028 B2 | * | 4/2019 | Blaney .................... F01D 11/08 |
| 10,287,896 B2 | | 5/2019 | Marcin, Jr. et al. |
| 10,316,683 B2 | * | 6/2019 | Palmer .................. F01D 25/246 |
| 10,449,605 B2 | | 10/2019 | Bullied et al. |
| 10,458,249 B2 | | 10/2019 | McCaffrey et al. |
| 10,584,602 B2 | | 3/2020 | Bareiss et al. |
| 10,843,271 B2 | | 11/2020 | Motin et al. |
| 2005/0091848 A1 | | 5/2005 | Nenov et al. |
| 2007/0141368 A1 | | 6/2007 | Farmer et al. |
| 2013/0205801 A1 | | 8/2013 | Xu et al. |
| 2014/0237784 A1 | | 8/2014 | Lacy et al. |
| 2014/0263579 A1 | | 9/2014 | Kulkarni et al. |
| 2014/0294652 A1 | | 10/2014 | Morrison et al. |
| 2015/0345296 A1 | | 12/2015 | Davidson et al. |
| 2016/0158840 A1 | * | 6/2016 | Cologna ................. B22F 3/105 419/7 |
| 2016/0186612 A1 | | 6/2016 | Anga et al. |
| 2017/0333995 A1 | | 11/2017 | Ott et al. |
| 2018/0223681 A1 | | 8/2018 | Gallier et al. |
| 2019/0039133 A1 | | 2/2019 | Cui et al. |
| 2019/0076930 A1 | | 3/2019 | Mottin et al. |
| 2020/0215640 A1 | | 7/2020 | Sheedy et al. |
| 2021/0254474 A1 | | 8/2021 | Farris et al. |
| 2022/0403742 A1 | | 12/2022 | Hazel et al. |
| 2023/0151736 A1 | | 5/2023 | Hazel et al. |

FOREIGN PATENT DOCUMENTS

| | | | |
|---|---|---|---|
| EP | 0744529 | A1 | 11/1996 |
| EP | 1097779 | A1 | 5/2001 |
| EP | 1332824 | A2 | 8/2003 |
| EP | 1643081 | A2 | 4/2006 |
| EP | 1760265 | B1 | 7/2007 |
| EP | 2078579 | A1 | 7/2009 |
| EP | 2511482 | A2 | 10/2012 |
| EP | 2657451 | A2 | 10/2013 |
| EP | 2982471 | A1 | 2/2016 |
| EP | 3034810 | A1 | 6/2016 |
| EP | 3090139 | A2 | 11/2016 |
| EP | 3095971 | A1 | 11/2016 |
| EP | 3575016 | A1 | 12/2019 |
| EP | 3575424 | A1 | 12/2019 |
| EP | 3712122 | A1 | 9/2020 |
| EP | 3848555 | A1 | 7/2021 |
| EP | 3865664 | A1 | 8/2021 |
| FR | 2981590 | A1 | 4/2013 |
| WO | 2015023321 | A2 | 2/2015 |
| WO | 2015122953 | A2 | 8/2015 |
| WO | 2021023945 | A1 | 2/2021 |

OTHER PUBLICATIONS

Lin et al.;"Solid-State Joining of Dissimilar Ni-Based Superalloys via Field-Assisted Sintering Technology for Turbine Applications"; Metallurgical and Materials Transactions A 52.6; Jun. 2021, pp. 2149-2154.

Search Report issued in European Patent Application No. 22179741.8; Application Filing Date Jun. 17, 2022; dated Oct. 31, 2022 (8 pages).

Search Report issued in European Patent Application No. 22179744.2; Application Filing Date Jun. 17, 2022; dated Oct. 31, 2022 (8 pages).

Search Report issued in European Patent Application No. 22179758.2; Application Filing Date Jun. 17, 2022; dated Nov. 3, 2022 (7 pages).

Search Report issued in European Patent Application No. 22179759.0; Application Filing Date Jun. 17, 2022; dated Nov. 4, 2022 (9 pages).

Search Report issued in European Patent Application No. 22179733.5; Application Filing Date Jun. 17, 2022; dated Nov. 9, 2022 (11 pages).

Search Report issued in European Patent Application No. 22179745.9; Application Filing Date Jun. 17, 2022; dated Nov. 9, 2022 (12 pages).

Walston; "Coating and Surface Technologies for Turbine Airfoils"; Superalloys 2004; TMS (The Minerals, Metals & Materials Society); Jan. 2004, pp. 579-588.

Brochure: "International Workshop on Field Assisted Sintering Technology" Jun. 2017, The Pennsylvania State University, University Park, Pennsylvania (2 pages).

Charis Lin, et al.:"Single Crystal Ni Superalloy Joining: Preliminary Results", Updated Nov. 9, 2020; pp. 1-20.

* cited by examiner

ADVANCED PASSIVE CLEARANCE CONTROL (APCC) CONTROL RING PRODUCED BY FIELD ASSISTED SINTERING TECHNOLOGY (FAST)

CROSS-REFERENCE TO RELATED APPLICATIONS

This application claims priority to U.S. Provisional Application No. 63/212,325 filed Jun. 18, 2021, and U.S. Provisional Application No. 63/232,967 filed Aug. 13, 2021, the contents of which are hereby incorporated by reference in their entirety.

BACKGROUND

The present disclosure relates to a control ring and, more particularly, to an improved advanced passive clearance control (APCC) control ring that can be produced by field assisted sintering technology.

In a gas turbine engine, an APCC system is often used to control tip clearance within a high-pressure turbine or HPT. To maximize the performance of the APCC system, the APCC is typically configured such that the control ring provides a slow thermal response to throttle changes. Generally, such a slow thermal response requires relatively high mass and reduced surface areas to be achievable.

Accordingly, a need exists for a production method that allows an improved APCC control ring to be produced.

BRIEF DESCRIPTION

According to an aspect of the disclosure, an advanced passive clearance control (APCC) control ring is provided. The APCC control ring includes first and second cover sections, first and second wall sections and a control ring. At least one of the first and second cover sections is bonded to corresponding edges of the first and second wall sections by field assisted sintering technology (FAST) processing along a bond surface to form an enclosure for the control ring.

In accordance with additional or alternative embodiments, both the first and second cover sections are bonded to corresponding edges of the first and second wall sections by the FAST processing along corresponding bond surfaces.

In accordance with additional or alternative embodiments, the control ring is a full-hoop control ring and the first and second cover sections and the first and second wall sections are fully annular.

In accordance with additional or alternative embodiments, the control ring is segmented and the first and second cover sections and the first and second wall sections are partially annular.

In accordance with additional or alternative embodiments, the enclosure forms a thermally isolated cavity therein.

In accordance with additional or alternative embodiments, a thermal barrier coating (TBC) is applied to exterior surfaces of the first and second cover sections and the first and second wall sections.

In accordance with additional or alternative embodiments, hook elements are attached to one of the first and second wall sections.

According to an aspect of the disclosure, an advanced passive clearance control (APCC) control ring is provided. The APCC control ring includes first and second cover sections, first and second wall sections and a control ring. At least one of the first and second cover sections is bonded to corresponding edges of the first and second wall sections by field assisted sintering technology (FAST) processing along a planar bond surface to form an enclosure for the control ring.

In accordance with additional or alternative embodiments, both the first and second cover sections are bonded to corresponding edges of the first and second wall sections by the FAST processing along corresponding planar bond surfaces.

In accordance with additional or alternative embodiments, the control ring is a full-hoop control ring and the first and second cover sections and the first and second wall sections are fully annular.

In accordance with additional or alternative embodiments, the control ring is segmented and the first and second cover sections and the first and second wall sections are partially annular.

In accordance with additional or alternative embodiments, the enclosure forms a thermally isolated cavity therein.

In accordance with additional or alternative embodiments, a thermal barrier coating (TBC) is applied to exterior surfaces of the first and second cover sections and the first and second wall sections.

In accordance with additional or alternative embodiments, hook elements are attached to one of the first and second wall sections.

According to an aspect of the disclosure, a method of assembling an advanced passive clearance control (APCC) system is provided. The method includes forming an enclosure to thermally isolate a control ring. The forming of the enclosure includes bonding first a cover ring to respective first edges of inner and outer rings by field assisted sintering technology (FAST) and bonding a second cover ring to respective second edges of the inner and outer rings by the FAST.

In accordance with additional or alternative embodiments, the control ring and the enclosure are annular.

In accordance with additional or alternative embodiments, the control ring is a full-hoop control ring.

In accordance with additional or alternative embodiments, the control ring is segmented.

In accordance with additional or alternative embodiments, the method further includes applying a thermal barrier coating to exterior surfaces of the inner and outer rings and the first and second cover rings.

In accordance with additional or alternative embodiments, the method further includes attaching hook elements to the inner ring.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
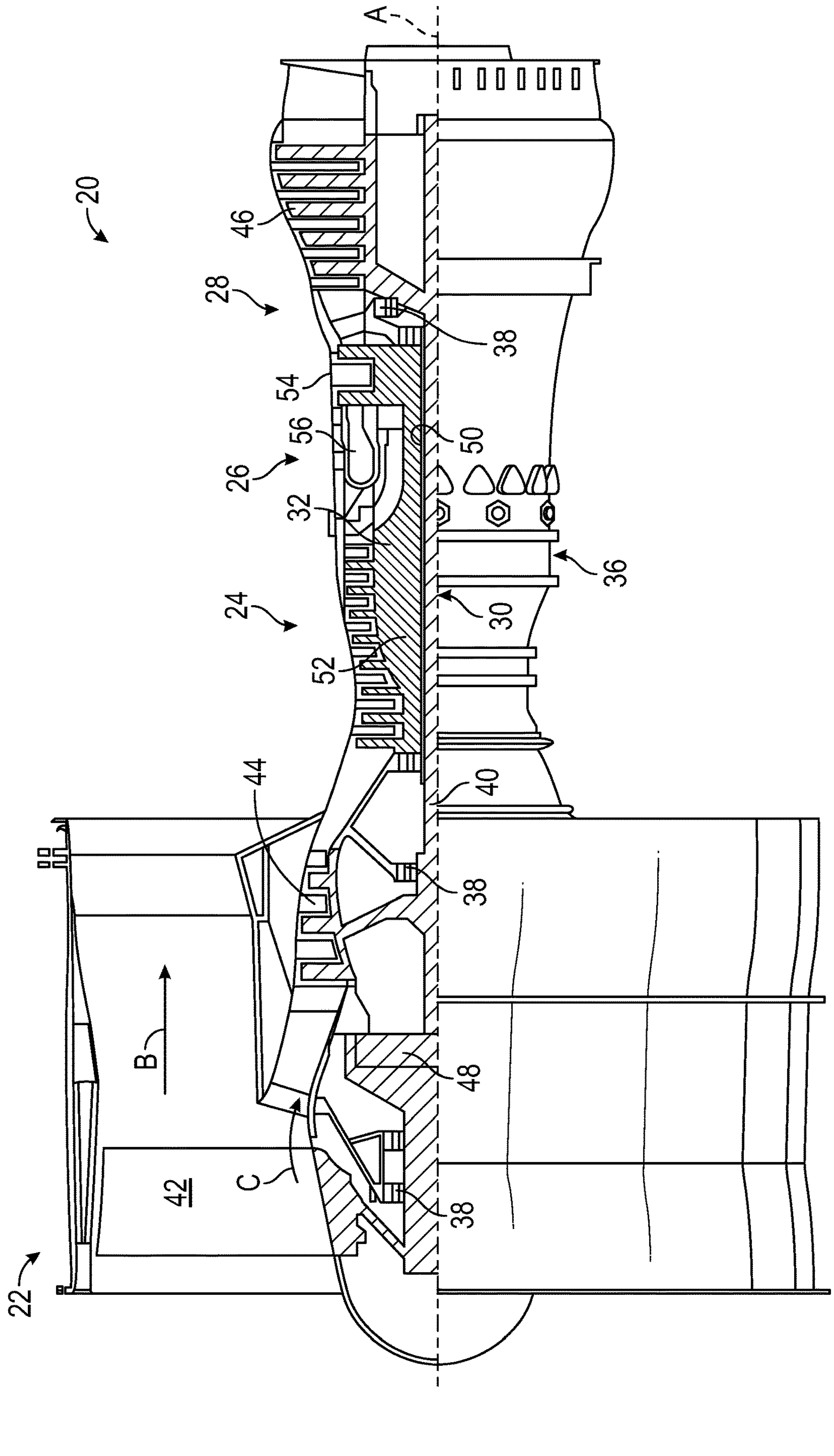
FIG. 1 is a partial cross-sectional view of a gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC'"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 m/sec).

Field assisted sintering technology (FAST) and spark plasma sintering (SPS) are consolidation processes that are executed at temperatures lower than the melting point of the subject materials. Similar to hot pressing, FAST forms bonds between materials but at temperatures ~200° C. lower. FAST utilizes a high amperage pulsed direct current (DC) electrical current to heat the subject materials to be bonded through Joule heating while under uniaxial compression. The consolidation is a combination of solid-state transport mechanisms including primarily diffusion and creep. The result is a metallurgical bond between the materials to be joined. Consolidation or joining can be accomplished in a variety of conductive and non-conductive materials and forms.

Recently, FAST/SPS has been gaining acceptance starting in the 1990s for consolidation of powder materials into dense compacts with significantly greater efficiency than hot pressing. Due to the lower processing temperatures of FAST/SPS over other consolidation methods, FAST/SPS mitigates significant grain growth common in other diffusional bonding methods. In some cases, bonding two dense metallic materials using the FAST process has been demonstrated. Material pairs included a same alloy (e.g., PWA 1429) and dissimilar alloys (e.g., PWA 1429 to CM247). Additionally, the ability to bond both single crystal (SX) and equiaxed (EQ) materials and the ability to retain fine features along bond surfaces or lines have been demonstrated.

As will be described below, FAST is used to provide a bonded geometry that encloses a lightweight structure. A thermal barrier coating (TBC) is provided on exterior surfaces which do not contact other hardware and sliding interfaces to reduce response times. Internal features can be machined to reduce weight. An outer shell so formed and mated by FAST can be used to enclose and isolate interior surfaces from convective heat transfer.

In greater detail, there are APCC systems that minimize tip clearances between blades and blade outer air seals (BOASs) in gas turbine engines such as the gas turbine engine 20 of FIG. 1. In growth configurations, a full hoop ring is assembled into a BOAS carrier ring with a cover to complete an enclosure. This enclosure thermally isolates the full hoop ring such that it responds slowly to transient thermal changes due to rapid throttle movements. In practice, the ring used in certain engine tests was not thermally isolated due to various leakages. The disclosure in the following description would permanently bond the cover to the BOAS carrier ring to create an ideal thermally isolated cavity.

With continued reference to FIG. 1, an APCC control ring can be disposable in various regions of a high pressure turbine as part of an APCC system to minimize tip clearances between blades and BOASs.

Figure 3:
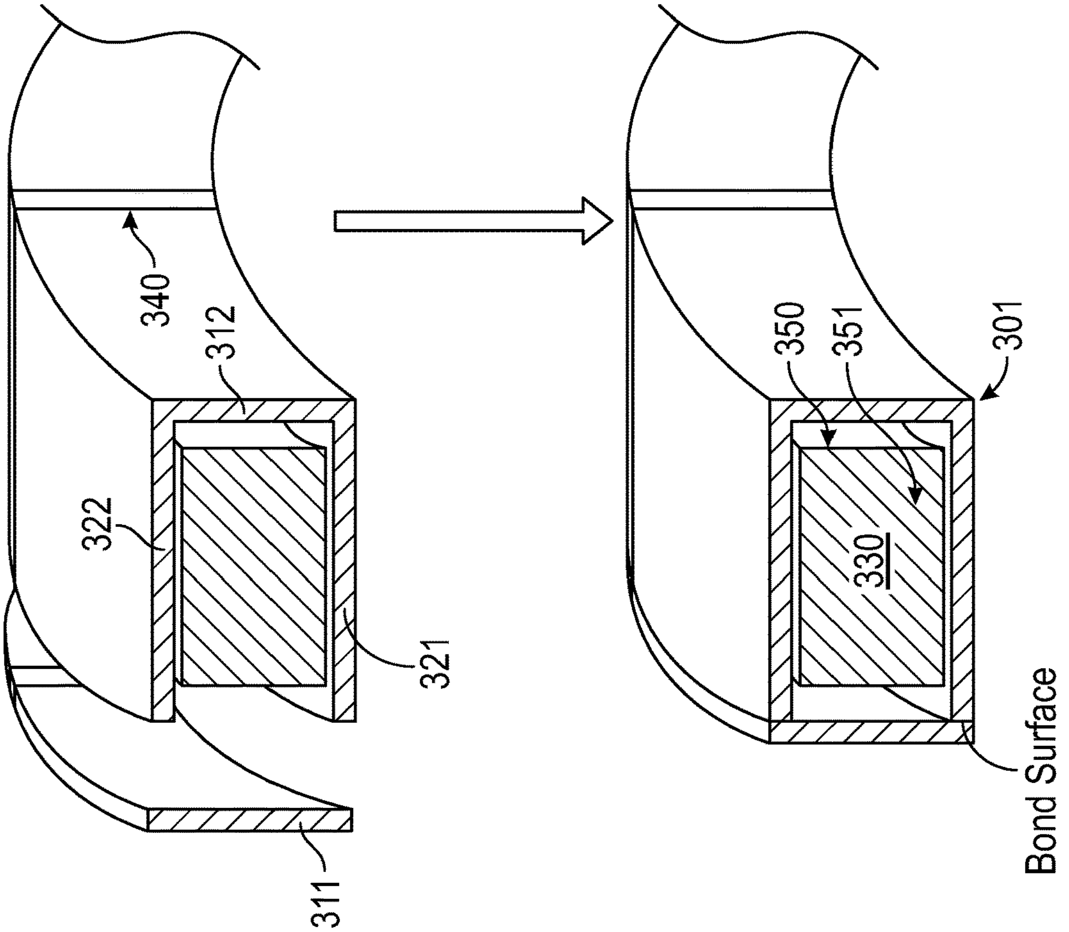
FIG. 3 is a schematic side view of an APCC segmented control ring in accordance with embodiments.
Figure 2:
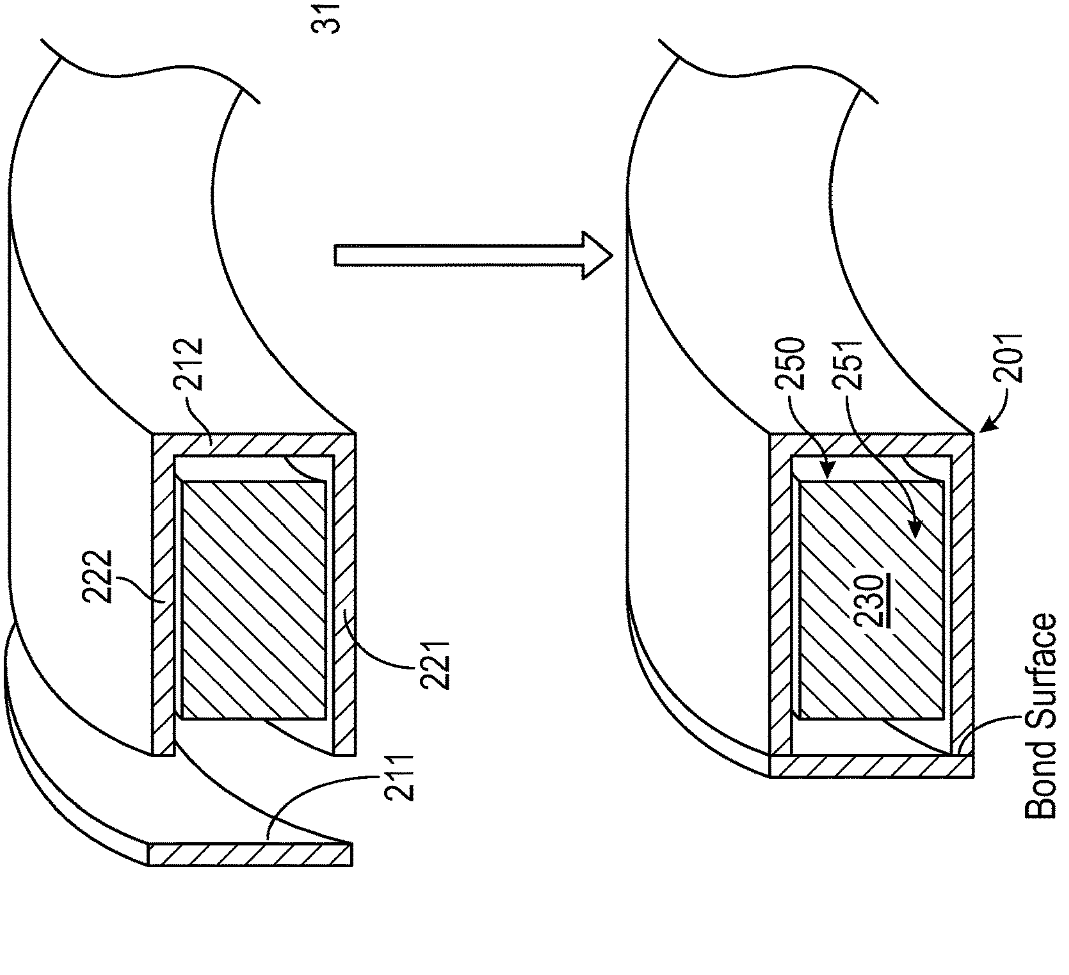
FIG. 2 is a schematic side view of an APCC full-hoop control ring in accordance with embodiments.

With reference to FIGS. 2 and 3, an APCC with a full-hoop control ring 201 (see FIG. 2) and an APCC with a segmented control ring 301 (see FIG. 3) are provided for use in any of the various regions of the high pressure turbine.

As shown in FIG. 2, the APCC with the full-hoop control ring 201 includes first and second annular side sections 211 and 212, first and second annular wall sections 221 and 222 and a full-hoop control ring 230. The first and second annular side sections 211 and 212 and the first and second annular side sections 221 and 222 can be formed independently from each other, though they are illustrated in FIG. 2 with the first annular side section 211 already being attached (by FAST processing along a planar bond surface) to the first and second annular wall sections 221 and 222. In any case, as shown in FIG. 2 at least the second annular side section 212 is bonded to the first and second annular wall sections 221 and 222 by FAST processing along a bond surface. In some, but not all cases, the bond surface can be a planar bond surface. This forms an enclosure 250 with a thermally isolated cavity 251 therein for the full-hoop control ring 230.

As shown in FIG. 3, the APCC with the segmented control ring 301 includes first and second annular side sections 311 and 312, first and second annular wall sections 321 and 322 and a segmented control ring 330 all of which are segmented at break point 340. The first and second annular side sections 311 and 312 and the first and second annular side sections 321 and 322 can be formed independently from each other, though they are illustrated in FIG. 3 with the first annular side section 311 already being attached (by FAST processing along a planar bond surface) to the first and second annular wall sections 321 and 322. In any case, as shown in FIG. 3 at least the second annular side section 312 is bonded to the first and second annular wall sections 321 and 322 by FAST processing along a bond surface. In some, but not all cases, the bond surface can be a planar bond surface. This forms an enclosure 350 with a thermally isolated cavity 351 for the segmented control ring 330.

For the embodiments of FIGS. 2 and 3 and in other cases, the bond surface need not be a planar bond surface. For example, in some additional or alternative embodiments of FIG. 2, the bond surface could be the annular outer surface of the first annular wall section 221 or the annular inner surface of the second annular wall section 222. Similarly, in some additional or alternative embodiments of FIG. 3, the bond surface could be the annular outer surface of the first annular wall section 321 or the annular inner surface of the second annular wall section 322. Hybrid configurations are also possible.

Generally, it is to be understood that a requirement for FAST/SPS processing, as in the embodiments of FIGS. 2 and 3, is a uniaxial loading direction where that loading brings the two surfaces being bonded into contact. The surfaces can be oriented as a flat surface perpendicular to the loading direction, at an offset angle to the loading direction (albeit not parallel to it), a shaped surface such as a "V", a sawtooth, a curve or any other complex arrangement.

Figure 4:
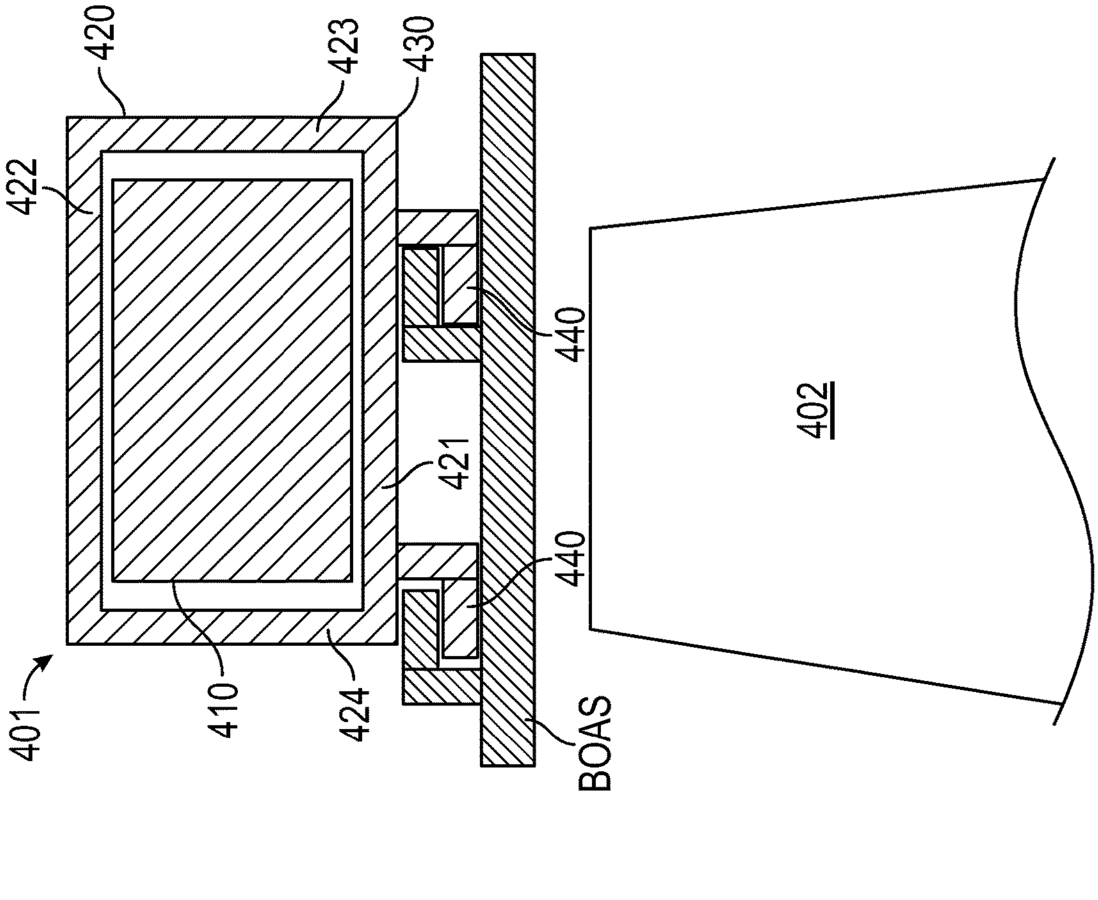
FIG. 4 is a schematic side view of an APCC control ring in accordance with embodiments.

With reference to FIG. 4, an APCC system 401 is provided and includes a control ring 410, which could be a full-hoop or segmented, and an enclosure 420 to thermally isolate the control ring 410. Both the control ring 410 and the enclosure 420 are at least partially annular. The enclosure 420 includes an inner ring 421, an outer ring 422, a first cover ring 423 extending between respective first edges of the inner ring 421 and the outer ring 422 and a second cover ring 424 extending between respective second edges of the inner ring 421 and the outer ring 422. The first and second cover rings 423 and 424 can be bonded by FAST to the respective first and second edges of the inner ring 421 and the outer ring 422 along respective bond surfaces, such as the respectively planar bond surfaces. A TBC 430 can be applied to exterior surfaces of the inner and outer rings 421 and 422, the sidewall ring 423 and the cover ring 424. Hook elements 440 can be attached to the inner ring 421 and can be attached to corresponding hook elements of a blade outer air seal (BOAS) for a turbine blade 402.

Again, for the embodiments of FIG. 4 and in other cases, the bond surface need not be a planar bond surface. For example, in some additional or alternative embodiments of FIG. 4, the bond surface could be the annular outer surface of the inner ring 421 or the annular inner surface of the outer ring 422. Hybrid configurations are also possible.

Generally, it is to be understood that a requirement for FAST/SPS processing, as in the embodiments of FIG. 4, is a uniaxial loading direction where that loading brings the two surfaces being bonded into contact. The surfaces can be oriented as a flat surface perpendicular to the loading direction, at an offset angle to the loading direction (albeit not parallel to it), a shaped surface such as a "V", a sawtooth, a curve or any other complex arrangement.

Figure 5:
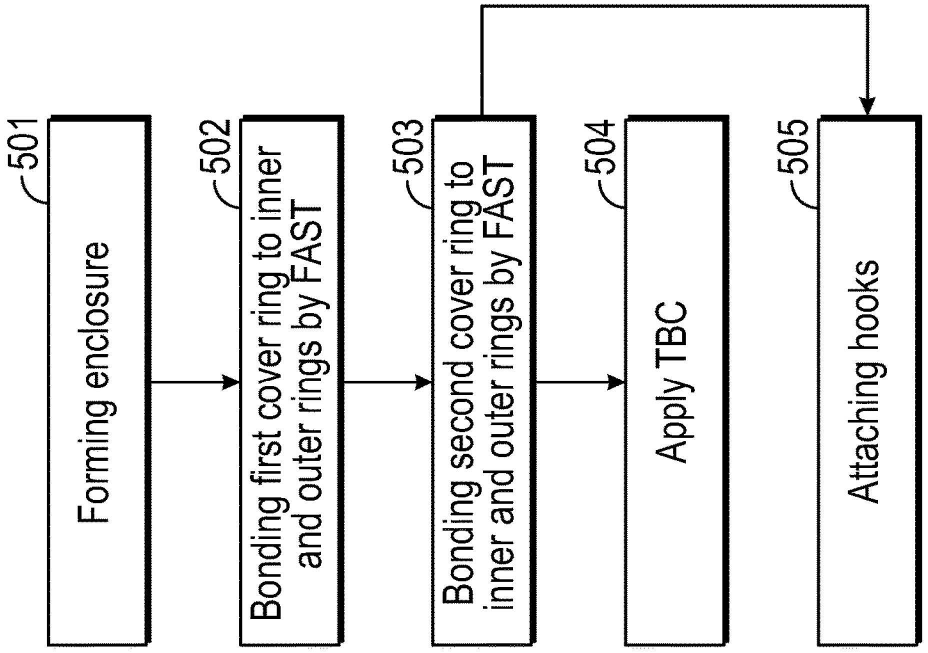
FIG. 5 is a flow diagram illustrating a method of assembling an APCC control ring in accordance with embodiments.

With reference to FIG. 5, a method of assembling an APCC system is provided. As shown in FIG. 5, the method includes forming an enclosure to thermally isolate a control ring (501), wherein the forming of the enclosure includes bonding a first cover ring to respective first edges of inner and outer rings by FAST (502) and bonding second a cover ring to respective second edges of the inner and outer rings by FAST (503). The control ring and the enclosure are at least partially annular and can be full-hoop components or segmented. The method can further include applying a TBC to exterior surfaces of the inner and outer rings and the first and second cover rings (504) and attaching hook elements to the inner ring (505).

In an embodiment, a first alloy for use in the APCC control ring and the methods described herein may be a "high strength" metal alloy. Examples of the first alloy include PWA 1429, René N5, CMSX-4, CMSX-10, TMS-138 or TMS-162. The metal alloys are nickel-based metals that in addition to nickel comprise one or more of chromium, cobalt, molybdenum, aluminum, titanium, tantalum, niobium, ruthenium, rhenium, boron and carbon. The metal alloys contain one or more of the following metals in addition to nickel—2 to 10 wt % of chromium, 2 to 11 wt % of cobalt, 0.5 to 5 wt % molybdenum, 4 to 7.5 wt % of tungsten, 3-7 wt % of aluminum, 0 to 5 wt % of titanium, 3 to 10 wt % of tantalum and 2-8 wt % of rhenium. The metal alloys may also contain ruthenium, carbon and boron.

The composition of these alloys is defined to maximize mechanical properties in a single crystal form while maintaining an adequate level of environmental resistance. Table 1 and Table 2 shows preferred ranges (of the ingredients) for the compositions (in weight percent) that may be used for the first alloy. Table 2 contains broader ranges for some of the alloys (than those indicated in Table 1) that may be used in the first portion.

The second alloys can be a nickel-based alloy that in addition to nickel includes one or more of chromium, cobalt, molybdenum, aluminum, titanium, tantalum, niobium, ruthenium, rhenium, boron and carbon. The metal alloys contain one or more of the following metals in addition to nickel—7 to 14 wt % of chromium, 3 to 9 wt % of cobalt, 0.1 to 0.2 wt % molybdenum, 3 to 5 wt % of tungsten, 6-9 wt % of aluminum, 0 to 5 wt % of titanium, 4 to 6 wt % of tantalum, 0.1 to 0.2 wt % of hafnium and 1-2 wt % of rhenium. The metal alloys may also contain ruthenium, carbon and boron.

TABLE 1

Composition of cast superalloys.

| Class | | Alloy | Compositions (wt. %) | | | | | | | | | | | | | | |
|---|---|---|---|---|---|---|---|---|---|---|---|---|---|---|---|---|---|
| | | | Cr | Co | Mo | W | Al | Ti | Ta | Nb | Re | Ru | Hf | C | B | Zr | Ni |
| Conventional | | IN-713LC | 12 | — | 4.5 | — | 5.9 | 0.6 | — | 2 | — | — | — | 0.05 | 0.01 | 0.1 | Bal |
| Cast (CC) | | IN-738LC | 16 | 8.5 | 1.75 | 2.6 | 3.4 | 3.4 | 1.75 | 0.9 | — | — | — | 0.11 | 0.01 | 0.04 | Bal |
| | | René 80 | 14 | 9 | 4 | 4 | 3 | 4.7 | — | — | — | — | 0.8 | 0.16 | 0.015 | 0.01 | Bal |
| | | Mar-M247 | 8 | 10 | 0.6 | 10 | 5.5 | 1 | 3 | — | — | — | 1.5 | 0.15 | 0.015 | 0.03 | Bal |
| DS | 1st | Mar-M200Hf | 8 | 9 | — | 12 | 5 | 1.9 | — | 1 | — | — | 2 | 0.13 | 0.015 | 0.03 | Bal |
| | | CM247LC | 8.1 | 9.2 | 0.5 | 9.5 | 5.6 | 0.7 | 3.2 | — | — | — | 1.4 | 0.07 | 0.015 | 0.007 | Bal |
| | 2nd | CM186LC | 6 | 9.3 | 0.5 | 8.4 | 5.7 | 0.7 | 3.4 | — | 3.0 | — | 1.4 | 0.007 | 0.015 | 0.005 | Bal |
| | | PWA1426 | 6.5 | 10 | 1.7 | 6.5 | 6 | 4 | 4 | 3.0 | 3.0 | 1.5 | 1.5 | 0.1 | 0.015 | 0.1 | Bal |
| SC | 1st | CMSX-2 | 8 | 5 | 0.6 | 8 | 5.6 | 1 | 6 | — | — | — | — | — | — | — | Bal |
| | | PWA1480 | 10 | 5 | — | 4 | 5 | 1.5 | 12 | — | — | — | — | — | — | — | Bal |
| | | René N4 | 9 | 8 | 2 | 6 | 3.7 | 4.2 | 4 | 0.5 | — | — | — | — | — | — | Bal |
| | | AM1 | 7 | 8 | 2 | 5 | 5 | 1.8 | 8 | 1 | — | — | — | — | — | — | Bal |
| | | RR2000 | 10 | 15 | 3 | — | 5.5 | 4 | — | — | — | — | — | — | — | — | Bal |
| | 2nd | CMSX-4 | 6.5 | 9.6 | 0.6 | 6.4 | 5.6 | 1 | 6.5 | — | 3 | — | 0.1 | — | — | — | Bal |
| | | PWA1484 | 5 | 10 | 2 | 6 | 5.6 | — | 9 | — | 3 | — | 0.1 | — | — | — | Bal |
| | | René N5 | 7 | 8 | 2 | 5 | 6.2 | — | 7 | — | 3 | — | 0.2 | — | — | — | Bal |
| | 3rd | CMSX-10 | 2 | 3 | 0.4 | 5 | 5.7 | 0.2 | 8 | — | 6 | — | 0.03 | — | — | — | Bal |
| | 4th | TMS-138 | 2.9 | 5.9 | 2.9 | 5.9 | 5.9 | — | 5.6 | — | 4.9 | 2 | 0.1 | — | — | — | Bal |
| | 5th | TMS-162 | 2.9 | 5.8 | 3.9 | 5.8 | 5.8 | — | 5.6 | — | 4.9 | 6 | 0.09 | — | — | — | Bal |
| | Re-free | CMSZ-7 | 6 | 10 | 0.6 | 9 | 5.7 | 0.8 | 9 | — | — | — | 0.2 | — | — | — | Bal |
| | Low Re | CMXS-8 | 5.4 | 10 | 0.6 | 8 | 5.7 | 0.7 | 8 | — | 1.5 | — | 0.1 | — | — | — | Bal |

TABLE 2

| | Cr | Co | Mo | W | Al | Ti | Ta | Nb | Re | Ni |
|---|---|---|---|---|---|---|---|---|---|---|
| PWA1429 | 5-7 | 9-11 | 1.5-2.5 | 5.5-7.5 | 5-7 | — | 3-10 | — | 2-4 | balance |
| René N5 | 6-10 | 7-9 | 1.5-2.5 | 4-7 | 3-7 | 0-5 | 3-8 | 0-1 | 0-4 | balance |
| CMSX-4 | 4-8 | 7-10 | 0.5-1.5 | 5.5-7.5 | 5-6 | 0-2 | 5-8 | — | 2-4 | balance |
| CMSX-10 | 1-3 | 2-4 | 0.1-1 | 4-6 | 5-7 | 0.1-0.4 | 6-10 | | 4-8 | balance |
| TMS-138 | 2-4 | 3.5-6.5 | 2-4 | 5-7 | 5-7 | — | 5-7 | | 4-6 | balance |
| TMS-162 | 2-4 | 3.5-6.5 | 3-5 | 5-7 | 5-7 | — | 5-7 | | 5-7 | balance |

The high strength alloys can withstand stresses of greater than 800 MPa at temperatures greater than 600° C. and stresses of greater than 200 MPa at temperatures of greater than 800° C.

Second alloys for use in the APCC control ring and the methods described herein are selected for their ability to handle harsh environmental conditions and can include René 195 and René N2. These compositions were developed with an eye to improved environmental resistance. This can be seen in the Al and Cr levels as compared with Re, W, Mo shown in the Table 3. The cobalt to chromium ratios are lower for the second alloys, while the aluminum to cobalt ratio is much higher for the second alloys when compared with the first alloys.

TABLE 3

| | Cr | Co | Al | Ta | Mo | W | Re | Hf | Ni |
|---|---|---|---|---|---|---|---|---|---|
| René 195 | 7-9 | 3-4 | 7-9 | 5-6 | 0.1-0.2 | 3-5 | 1-2 | 0.1-0.2 | balance |
| Rene N2 | 12-14 | 7-9 | 6-8 | 4-6 | | 3-4 | 1-2 | 0.1-0.2 | balance |

The high strength alloys used in the second alloys can withstand stresses of at least 50% of the first alloys. In an embodiment, the high strength alloys used in the second alloys are environmentally resistant and withstand temperatures of greater than 1200° C. (under oxidation conditions) while undergoing less than 0.05 grams of weight loss per unit weight.

Technical effects and benefits of the present disclosure are the provision of FAST processing to produce a lightweight and slowly responding APCC control ring.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An advanced passive clearance control (APCC) control ring, comprising:

first and second cover sections;

first and second wall sections; and a control ring, at least one of the first and second cover sections being bonded to corresponding edges of the first and second wall sections by field assisted sintering technology (FAST) processing along a bond surface to form an enclosure for the control ring, wherein the APCC control ring further comprises a thermal barrier coating (TBC) applied to exterior surfaces of the first and second cover sections and the first and second wall sections.

2. The APCC control ring according to claim 1, wherein both the first and second cover sections are bonded to corresponding edges of the first and second wall sections by the FAST processing along corresponding bond surfaces.

3. The APCC control ring according to claim 1, wherein the control ring is a full-hoop control ring and the first and second cover sections and the first and second wall sections are fully annular.

4. The APCC control ring according to claim 1, wherein the control ring is segmented and the first and second cover sections and the first and second wall sections are partially annular.

5. The APCC control ring according to claim 1, wherein the enclosure forms a thermally isolated cavity therein.

6. The APCC control ring according to claim 1, further comprising hook elements attached to one of the first and second wall sections.

7. An advanced passive clearance control (APCC) control ring, comprising:

first and second cover sections;

first and second wall sections; and a control ring, at least one of the first and second cover sections being bonded to corresponding edges of the first and second wall sections by field assisted sintering technology (FAST) processing along a planar bond surface to form an enclosure for the control ring, wherein the APCC control ring further comprises a thermal barrier coating (TBC) applied to exterior surfaces of the first and second cover sections and the first and second wall sections.

8. The APCC control ring according to claim 7, wherein both the first and second cover sections are bonded to corresponding edges of the first and second wall sections by the FAST processing along corresponding planar bond surfaces.

9. The APCC control ring according to claim 7, wherein the control ring is a full-hoop control ring and the first and second cover sections and the first and second wall sections are fully annular.

10. The APCC control ring according to claim 7, wherein the control ring is segmented and the first and second cover sections and the first and second wall sections are partially annular.

11. The APCC control ring according to claim 7, wherein the enclosure forms a thermally isolated cavity therein.

12. The APCC control ring according to claim 7, further comprising hook elements attached to one of the first and second wall sections.

13. A method of assembling an advanced passive clearance control (APCC) system, the method comprising:

forming an enclosure to thermally isolate a control ring, wherein the forming of the enclosure comprises:

bonding first a cover ring to respective first edges of inner and outer rings by field assisted sintering technology (FAST); and bonding a second cover ring to respective second edges of the inner and outer rings by the FAST, wherein the method further comprises applying a thermal barrier coating to exterior surfaces of the inner and outer rings and the first and second cover rings.

14. The method according to claim 13, wherein the control ring and the enclosure are annular.

15. The method according to claim 13, wherein the control ring is a full-hoop control ring.

16. The method according to claim 13, wherein the control ring is segmented.

17. The method according to claim 13, further comprising attaching hook elements to the inner ring.

* * * * *